July 14, 1959 — C. C. MAU — 2,894,353
ANIMAL TRAP

Filed March 24, 1958 — 3 Sheets-Sheet 1

CLAYTON C. MAU
INVENTOR.

BY Harold E. Stonebraker
ATTORNEY

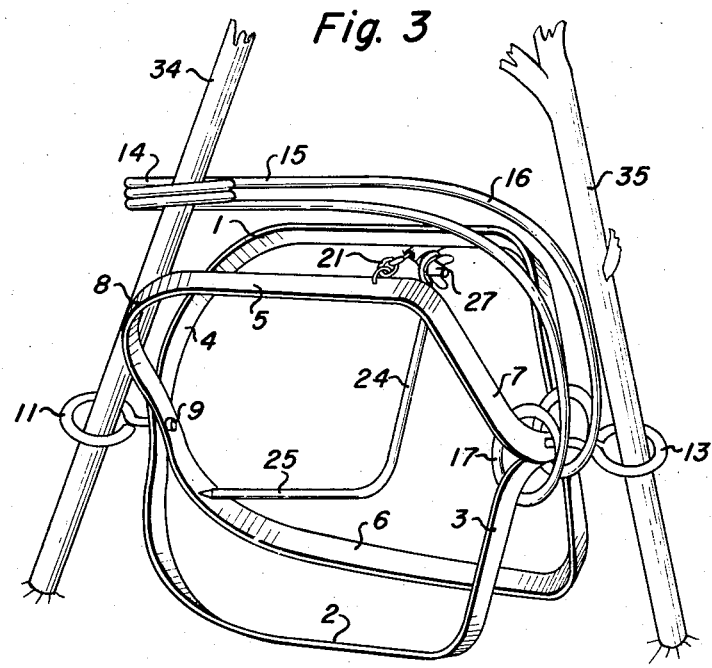
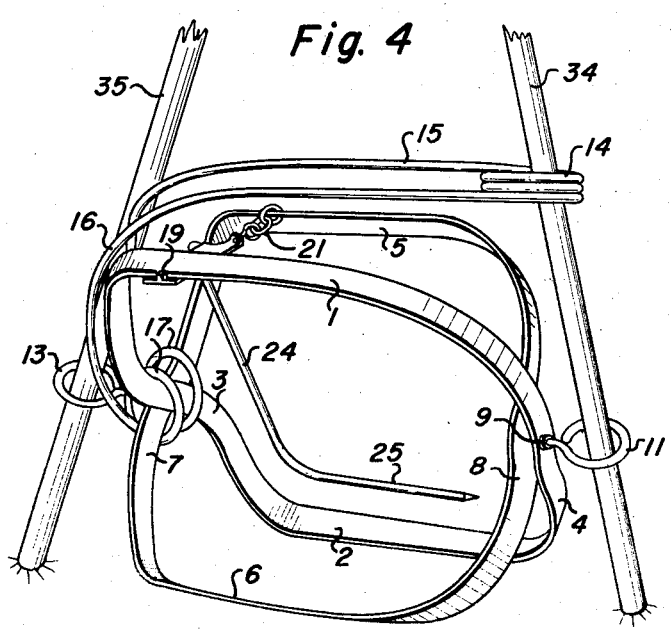

July 14, 1959   C. C. MAU   2,894,353
ANIMAL TRAP
Filed March 24, 1958   3 Sheets-Sheet 3
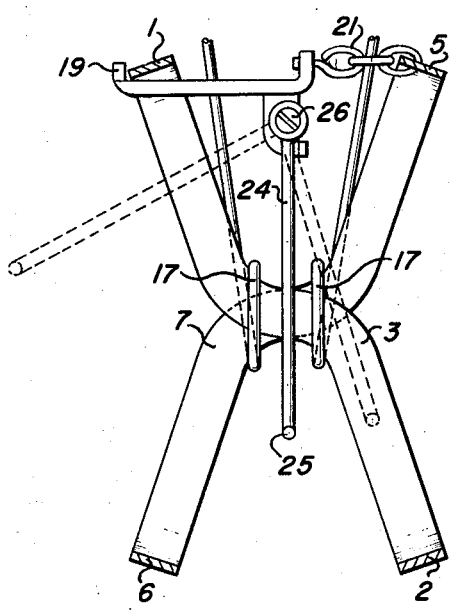
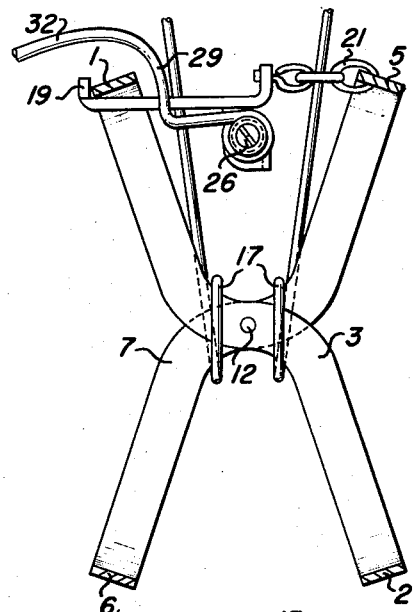
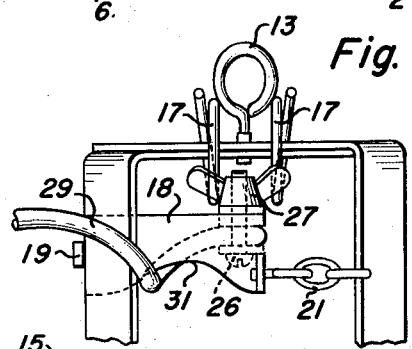
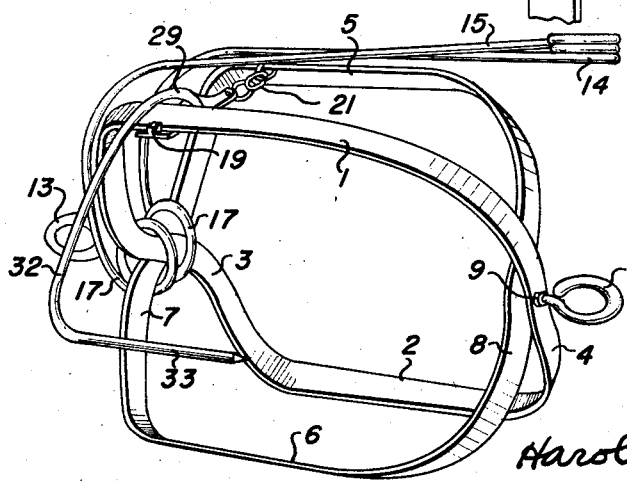
CLAYTON C. MAU
INVENTOR.
BY Harold E. Stonebraker
ATTORNEY United States Patent Office 2,894,353
Patented July 14, 1959

2,894,353

ANIMAL TRAP

Clayton C. Mau, Geneseo, N.Y.

Application March 24, 1958, Serial No. 723,243

6 Claims. (Cl. 43—88)

This invention relates to an animal trap, and has for its purpose to afford a trap provided with spring-actuated jaws constructed and arranged in such a manner as to insure gripping the animal around its neck and fracturing its neck to make certain of instant killing, and avoid gripping a foot or leg as in conventional traps.

The invention is in the nature of an improvement on the construction disclosed in my Patents Nos. 2,564,811, August 21, 1951, and 2,701,428, Febrcary 8, 1955, which disclose a pair of pivotally connected co-acting spring-actuated loop-shaped jaws between which the animal is caught and which are designed for trapping muskrats, skunks, racoons, and other small animals, and it has been found that in some instances, a small animal entering through the space between the jaws will strike the trigger with its head or foot and spring the trap sufficiently in advance of its movement through the trap so that the jaws strike the head of the animal, or a leg, and do not grip the neck, and it is a particular purpose of the invention to make certain of killing the animal instantly by breaking its neck or choking it, so that its leg will not be gripped and the trap cannot accidentally be sprung before the animal reaches the position that insures instant killing.

A further purpose of the invention is to afford a trap of the general type mentioned, and provided with trigger mechanism which can be adjustably positioned so that an animal entering the trap cannot strike the trigger and release the jaws prematurely by engagement with the trigger in advance of the proper point of release, but must necessarily engage the trigger at a delayed point and move it transversely of the path of the animal, causing a tripping movement of the detent which releases the jaws.

An objection to the former construction has been that the trap can be sprung and the jaws released at a point such as to grip a foot of the animal, or its head or nose, and this objection has been overcome by arranging the trigger so that it is positioned at one end of the trap or to one side of its transverse vertical center instead of in the vertical plane of its transverse center, and adjusting it forwardly of the longitudinal center of the trap, or in advance of the travel of the animal through the trap so that the trap can be arranged to permit movement of the animal through the trap with the trigger positioned in advance of the longitudinal center of the trap, and thus compel the animal to travel a greater distance within the trap before striking the trigger, and so insure release and closing of the jaws at such a point as to cause the jaws to close on the neck or back of the head of the animal.

Another purpose of the invention is to provide trigger mechanism including a trigger having a horizontally arranged portion extending laterally in proximity to the base of the trap and a vertical portion at one end of the trap, the trigger being adjustable on a supporting member or plate to enable securing the trigger at such selected point as to insure the animal's engaging the trigger and releasing the jaws at a later point in the travel of the animal through the trap.

Still an additional object of the invention is to provide a structure whereby the trigger is removable from the supporting element which carries the detent that holds the jaws in set position, and can be replaced by a larger trigger that is attached for trapping larger animals when desired.

The trigger that is employed for trapping small animals is of such size that when adjusted to its maximum forward or rearward position, it does not extend between the jaws when the latter are closed, and it is a purpose of the invention to provide a larger trigger for trapping larger animals, the larger trigger being of such form that when the trap is set, the trigger extends outside the jaws beyond the outer portions of the jaws and thence over the outermost portions of the jaws, and when the latter are closed they do not strike the trigger and do not interfere with the jaws engaging the neck of the animal.

To these and other ends, the invention consists in the construction and arrangement of parts that will appear clearly from the following description when read in conjunction with the accompanying drawings, the novel features being pointed out in the claims following the specification.

Figure 2:
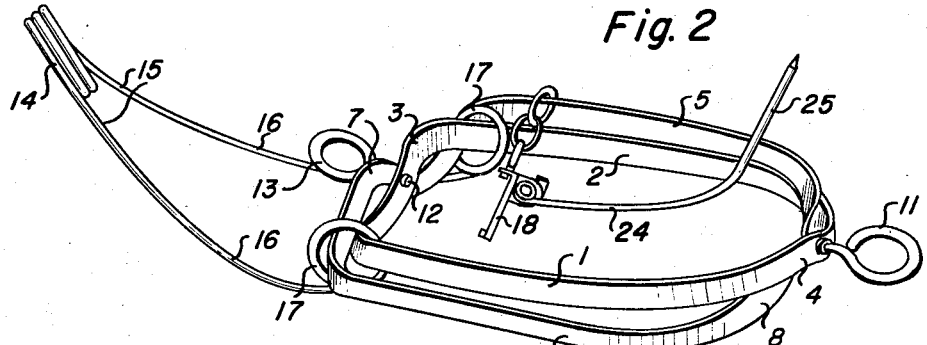
Fig. 2 is a perspective view looking in the opposite direction to that of Fig. 1.
Figure 8:
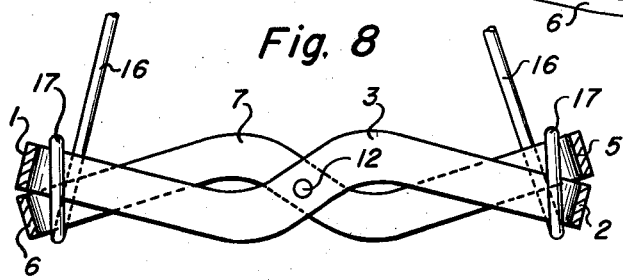
Figures 9, 10:
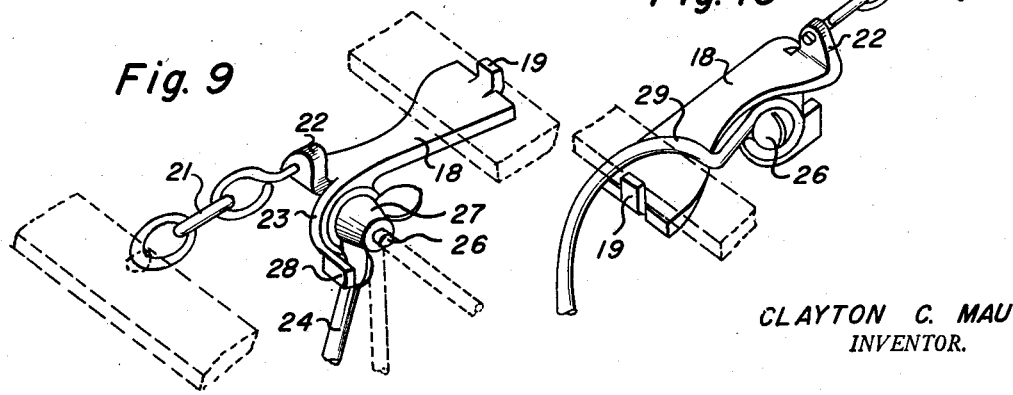

Fig. 3 is a perspective view showing the position of the parts when the trap is set with the actuating spring swung to its upper position above the trigger mechanism and between the side portions of the jaws, and anchoring means engaged through the coiled portion of the spring and the eye at the outer ends of the jaws, and additional anchoring means engaged through the eye at the inner ends of the jaws;

Fig. 4 is a perspective view looking in the opposite direction to that of Fig. 3;

Fig. 5 is a transverse vertical sectional view taken centrally of Fig. 4, and showing the trigger in full lines in vertical position and in dotted lines in its positions of maximum forward and rearward adjustment;

Fig. 6 is a similar view, showing the enlarged trigger mounted on the supporting element, when the trap is adapted for trapping larger animals;

Fig. 7 is a perspective view of the trap when equipped with the larger trigger, and in set position as in Fig. 6;

Fig. 8 is a sectional view taken transversely of Fig. 2;

Fig. 9 is an enlarged detailed perspective view showing the detent and trigger mechanism in operative position when the trap is set, the trigger being broken away and shown in full lines in its vertical position and in dotted lines in its forward and rearward adjusted positions;

Fig. 10 is a perspective view of the larger trigger shown in Figs. 6 and 7 attached to the supporting plate 18 on the side thereof opposite to where the trigger 24 is attached and Fig. 11 is a plan view of the same.

Referring more particularly to the drawings in which like reference numerals throughout the several views refer to the same parts, the structure includes inner and outer symmetrical jaws similar to those disclosed in my earlier patents hereinbefore referred to, the jaws being of generally rectangular loop-shaped form and pivotally connected at their ends.

Figure 1:
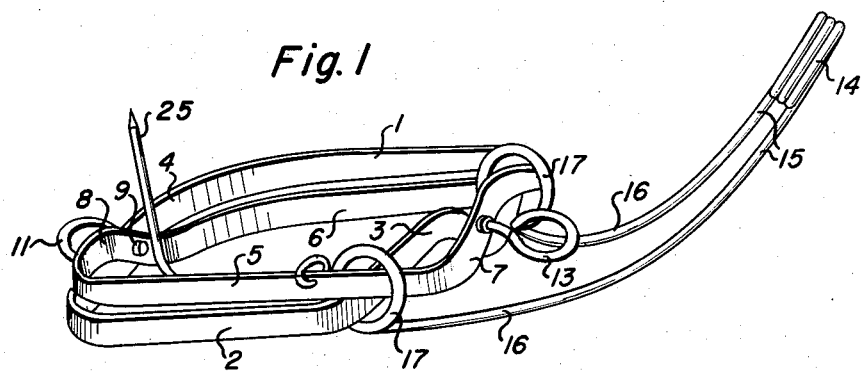
Fig. 1 is a perspective view of a trap constructed in accordance with one embodiment of the invention and showing the normal position of the parts before the trap is set, with the arms of the actuating spring in their outermost position on the jaws.

The jaws are formed of metal bar stock having a width of approximately ½" and a thickness of approximately ⅛", and include a loop-shaped jaw having side or gripping portions 1 and 2 and reversely curved end portions 3 and 4 connecting said side portions, while the pivotally connected cooperating jaw includes side portions 5 and 6 and reversely curved end portions 7 and 8 connecting said side portions, the reversely curved end portions 4 and 8 being pivotally connected at 9 and the reversely curved end portions 3 and 7 being pivotally connected at 12, see Figs. 1 and 2.

The jaws are so formed that when in normal released position, the cooperating gripping edges of the side portions 5 and 6 lie one upon the other and similarly the adjacent gripping edges of the side portions 2 and 5 lie one upon the other, see Figs. 1 and 2, while the reversely curved end portions 3 and 4 of one jaw extend respectively inwardly and outwardly of the reversely curved portions 7 and 8 of the other jaw.

The outer end portions 4 and 8 of the jaws are pivotally connected by a pin 9 which has its outer end formed to provide a rotatable eye 11, while the inner end portions 3 and 7 of the jaws are pivotally connected by a pin 12 that is extended and formed to provide a rotatable eye 13 located beyond the inner end portions of the jaws.

The jaws are actuated and released to their released positions by an actuating spring which includes a coiled portion 14 at its outer or free end and arms 15 which are bent intermediate the inner and outer ends of the spring as at 16, and formed at their inner ends with loops or connecting portions 17 each of which embraces an inner end portion of the two jaws and is slidable from a position against the side portions of the jaws when the trap is sprung, see Figs. 1 and 2, to a position adjacent the pivotal connection between the jaws, see Figs. 3 and 4, when the trap is set and the jaws open, at which time the arms 15 of the spring and coil 14 are moved upwardly to a position above the trigger mechanism and between the side portions of the jaws, see Figs. 3 and 4. When in this position, the spring serves as a barrier above and between the jaws and effectually prevents an animal from reaching or stepping between the side portions of the jaws at the top or otherwise springing the trap accidentally, and compelling the animal to enter the trap from one side to reach the bait on the trigger, or the trigger. Thus the animal must be between the gripping edges of the trap before it can be sprung.

The structure described thus far is substantially in accordance with the disclosure of my aforementioned earlier patents, and the instant invention has to do with the trigger and detent mechanism which will now be described, and by which the jaws are held in set position, ready to be released at a predetermined adjusted point when the animal moving into or through the trap strikes the trigger, moving it so as to rock the detent and release the jaws. This is accomplished in general by forming the detent on or as part of a supporting element or plate, upon which the trigger is adjustably and removably mounted, the supporting plate and detent being arranged at one end of the trap and connected by a chain to one jaw, the detent engaging and holding the other jaw when the trap is set.

The adjustable and removable trigger includes a vertical portion that is removably mounted on the supporting plate and a horizontal portion at the lower end of the vertical portion located in proximity to the bottom of the trap and extending from one end thereof toward and beyond the longitudinal center of the trap. With this arrangement the vertical portion of the trigger is in position to be engaged at one side by the head or body of the animal and tilted as it walks through, while the horizontal portion of the trigger is in position to be engaged by a foot or leg of the animal in rear of its head. By adjusting the trigger forwardly or in advance of the longitudinal center of the trap, it can be positioned accurately for engagement by a foot or leg of the animal sufficiently in rear of the head so that the jaws are released and sprung only after the animal's head is well within the trap, thus insuring the jaws coming into engagement with the neck or body of the animal and instant killing, instead of gripping a leg, head, or other forward portion which results in holding and injuring the animal but not killing it.

Referring to Figs. 5, 6, 7, and 9, 18 designates the supporting element or plate provided with a detent 19 for engagement with an edge of one jaw when the trap is set, and 21 is a chain of several links connected at one end to the other jaw and at its opposite end to an upstanding lug 22 on the supporting element 18, while 23 is a depending extension on plate 18, and adapted to hold the trigger that is adjustably attached thereto. The trigger is of heavy wire or other suitable material and comprises a vertical portion 24 terminating at its lower end in a right angled horizontal portion 25, and at its upper end in an eye that engages a bolt 26 which passes through an opening in the extension 23 and is held thereon by a thumb-nut 27, see Fig. 9. By loosening the nut 27, the trigger can be adjusted forward or rearward to the desired position and secured by tightening the nut 27, the extension 23 being provided with a stop 28 in the path of the trigger and acting to limit the adjustment of the trigger away from the vertical position in one direction, so that the trigger can not be adjusted to a position where it is engaged between the jaws when the trap is sprung.

The trap is set by forcing together the side portions or arms 15 of the spring, moving them from the position illustrated in Figs. 1 and 2 to the position illustrated in Figs. 3 and 4, whereupon the jaws can be opened from the position of Figs. 1 and 2 to the position illustrated in Figs. 3 and 4, and the detent 19 swung upwardly beneath the side portion of the jaw 1 until it is engaged with the outer edge of said jaw as shown in Figs. 3 and 4, and when the vertical portion 24 of the trigger is moved laterally by the animal pressing against the same, or by the animal's leg or foot striking the horizontal portion 25 of the trigger, the supporting member or plate 18 is rocked against the jaw 1 causing the detent 19 to be disengaged from the jaw 1, releasing the jaws which are then actuated by the arms 15 of the spring moving outwardly on the jaws and bringing the gripping edges of the jaws in engagement with the neck or body of the animal.

The trap may be positioned on the ground or in a hole, or fastened around a tree, rock, post, or other suitable support, or can be supported on the ground with the portions 2 and 6 of the jaws resting on the ground while the trigger mechanism is then located at the top of the trap and the actuating spring is folded upwardly over the top of the trap and between the side portions of the jaws, as shown in Figs. 3 and 4. With this arrangement, the actuating spring is protected against water, mud, snow, or ice on the ground as it would otherwise not be if the actuating spring were located on the under side of the trap when the latter is set and positioned in a hole or on the ground.

When positioned as described above, the coiled portion 14 of the spring and eye 11 are in approximate alinement, and in order to anchor the trap, any convenient stick, or metal stake or rod, as indicated at 34 can be inserted through the coiled portion 14 of the actuating spring, thence through the eye 11 at the end of the trap, and forced into the ground, while a second stick or rod 35 can be inserted through the eye 13 and forced into the ground. The trap is thus securely held against accidental or unintentional removal and is prevented from being dragged away from its original position. The eye 13 is arranged so that when the actuating spring is in its upper position, as in Figs. 3 and 4, the eye 13 extends between and beyond the connecting portions 17 and arms of the spring, so that a stick can be inserted therethrough without interference with the connecting portions and arms of the spring.

The trigger is adjusted on its supporting element to a position in advance of the direction of movement of the animal through the trap, when such movement is determinable in advance, and the trap so positioned that as the animal enters, the trigger is positioned sufficiently in advance of a vertical position so that the animal's head is well within the trap, before the animal's foot or leg can strike the horizontal portion 25 of the trigger and thus release the trap at a point so that the jaws will engage the neck or body of the animal instead of coming into contact with its head or nose, and thus insuring instant killing of the animal.

Where it is desirable to employ the trap for larger animals than would be caught by the trigger described above, a larger trigger is provided as shown in Figs. 6 and 7. For this purpose, the trigger disclosed in Figs. 3, 4 and 5 is removed from the supporting element or plate by first loosening the thumb nut 27 and removing the trigger from the bolt 26, following which the trigger disclosed in Figs. 6 and 7 is secured to the supporting element or plate 18 on the opposite side of the supporting plate from that to which the previously described trigger is attached. For this purpose the bolt 26 is reversely positioned on the extension 23 of the supporting plate and the trigger held in place by the thumb nut 27 attached on the inner surface of the extension 23. This larger trigger includes an eye that engages the bolt 26 and an upwardly reversely curved portion 29 that passes through a recess or cutout portion 31 provided at one edge of the supporting plate, see Fig. 9, and thence over the jaw 1, see Figs. 6 and 7, affording a curved downwardly extending portion 32 which terminates in a laterally or horizontally extending portion 33. Thus the horizontal portion 33 is located well in advance of the animal traveling through the trap so that when its leg or foot strikes the portion 33 of the trigger, it will insure the jaws engaging the neck or body of the animal, and since the portion 32 extends over the side portion 1 of the jaw, it is located outwardly of the jaws 1 and 6 and is not between the jaws when the latter move to closed position, so that at no time can the jaws strike any part of the larger trigger.

While the invention has been described with reference to the structure herein shown, it is not confined to the details set forth, and this application is intended to cover such modifications or departures as may come within the purposes of the improvement or the scope of the following claims.

I claim:

1. In an animal trap comprising a pair of cooperating loop-shaped jaws including end portions which are pivotally connected at their centers, a wire actuating spring including a coiled portion at its outer end and arms terminating at the inner end of the spring in connecting portions that embrace and are slidable on the end portions of the jaws on opposite sides of their pivotal connections, the improvement which consists in trigger and detent mechanism including an outwardly projecting detent positioned against the edge of one of the jaws at one end of the trap, a supporting element for the detent extending on opposite sides of the detent and engaging the edge of said jaw at spaced points from the detent whereby the detent is released from said edge by a rocking movement of the supporting element on said edge, a flexible connection between said supporting element and the other of said jaws, and a trigger comprising a vertical portion adjustably separably mounted on said supporting element to vary the angular relation of said vertical portion of the trigger, a horizontal portion at the bottom of the vertical portion, and fastening means retaining the vertical portion of the trigger in adjusted position.

2. In an animal trap comprising a pair of cooperating loop-shaped jaws including end portions which are pivotally connected at their centers, a wire actuating spring including a coiled portion at its outer end and arms terminating at the inner end of the spring in connecting portions that embrace and are slidable on the end portions of the jaws on opposite sides of their pivotal connection, the improvement which consists in trigger and detent mechanism including a supporting element having an outwardly projecting detent engaging the edge of one of the jaws at one end of the trap and the supporting element extending on opposite sides of the detent whereby the detent is released from said edge by a rocking movement of the supporting element on said edge, a flexible connection between said supporting element and the other of said jaws at a point between the longitudinal center of the trap and one end thereof, and a trigger comprising a vertical portion having one end pivotally mounted on said supporting element, means for holding said vertical portion in adjusted position on said supporting element, said vertical portion terminating at its opposite end in a horizontal portion extending endwise of the trap and located in proximity to the bottom of the trap.

3. In an animal trap comprising a pair of cooperating loop-shaped jaws including end portions which are pivotally connected at their centers, a wire actuating spring including a coiled portion at its outer end and arms terminating in the connecting portions that slidably embrace the end portions of the jaws on opposite sides of their pivotal connection, the improvement which consists in trigger and detent mechanism including a supporting element, a flexible connection between said supporting element and one of said jaws at a point between one end of the trap and the longitudinal center thereof, an outwardly projecting detent mounted on said supporting element and positioned against the outer edge of the other of said jaws, said supporting element extending on opposite sides of the detent engaged with the edge of said jaw at spaced points whereby the detent is released from said edge by a rocking movement of the supporting element, a trigger comprising a vertical portion separably mounted on said supporting element and terminates in a horizontal portion located in proximity to the bottom of the trap and extending from a point adjacent to one end of the trap toward the opposite end thereof, and fastening means retaining said vertical portion in adjusted position.

4. In an animal trap comprising a pair of cooperating loop-shaped jaws including end portions which are pivotally connected at their centers, a wire actuating spring including a coiled portion at its outer end and arms terminating in the connecting portions that slidably embrace the end portions of the jaws on opposite sides of their pivotal connection, the improvement which consists in trigger and detent mechanism including a supporting element, a flexible connection between said supporting element and one of said jaws at a point between one end of the trap and the longitudinal center thereof, an outwardly projecting detent mounted on said supporting element and positioned against the outer edge of the other of said jaws, said supporting element extending on opposite sides of the detent engaged with the edge of said jaw at spaced points whereby the detent is released from said edge by a rocking movement of the supporting element, an upwardly and outwardly curved trigger that is removably attached to said supporting element and extends over said jaw engaged by the detent.

5. In an animal trap comprising a pair of cooperating loop-shaped jaws including end portions which are pivotally connected at their centers, a wire actuating spring including a coiled portion at its outer end and arms terminating in the connecting portions that slidably embrace the end portions of the jaws on opposite sides of their pivotal connections, the improvement which consists in trigger and detent mechanism including a supporting element, a flexible connection between said supporting element and one of said jaws at a point between one end of the trap and the longitudinal center thereof, an outwardly projecting detent mounted on said supporting element and positioned against the outer edge of the other of said jaws, said supporting element extending on opposite sides of the detent engaged with the edge of said jaw at spaced points whereby the detent is released from said edge by a rocking movement of the supporting element, said supporting element including a plate, an ear at one end thereof secured to said flexible connection, a depending extension on said plate, a trigger having an eye rotatively mounted on said extension, and a stop on said extension in the path of the trigger acting to limit its adjustable movement in one direction.

6. In an animal trap comprising a pair of cooperating loop-shaped jaws including end portions which are pivotally connected at their centers, a wire actuating spring including a coiled portion at its outer end and arms terminating in the connecting portions that slidably embrace the end portions of the jaws on opposite sides of their pivotal connections, the improvement which consists in trigger and detent mechanism including a supporting element, a flexible connection between said supporting element and one of said jaws at a point between one end of the trap and the longitudinal center thereof, an outwardly projecting detent mounted on said supporting element and positioned against the outer edge of the other of said jaws, said supporting element extending on opposite sides of the detent engaged with the edge of said jaw at spaced points whereby the detent is released from said edge by a rocking movement of the supporting element, said supporting element including a plate, an ear at one end thereof secured to said flexible connection, a depending extension on said plate, a trigger having an eye rotatively mounted on said extension, the trigger comprising a portion extending from said eye outwardly and downwardly over said jaw and terminating in a horizontal portion extending centrally of the trap.

References Cited in the file of this patent
UNITED STATES PATENTS

| | | |
|---|---|---|
| 1,939,190 | Terry | Dec. 12, 1933 |
| 2,564,811 | Mau | Aug. 21, 1951 |
| 2,701,428 | Mau | Feb. 8, 1955 |